United States Patent
Giladi

(10) Patent No.: US 12,439,100 B2
(45) Date of Patent: Oct. 7, 2025

(54) METHODS, SYSTEMS, AND APPARATUSES FOR IMPROVED CONTENT STORAGE

(71) Applicant: Comcast Cable Communications, LLC, Philadelphia, PA (US)

(72) Inventor: Alexander Giladi, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/431,044

(22) Filed: Feb. 2, 2024

(65) Prior Publication Data
US 2025/0254373 A1    Aug. 7, 2025

(51) Int. Cl.
*H04N 21/231*    (2011.01)
*H04N 21/232*    (2011.01)
*H04N 21/239*    (2011.01)

(52) U.S. Cl.
CPC ..... *H04N 21/23106* (2013.01); *H04N 21/232* (2013.01); *H04N 21/2393* (2013.01)

(58) Field of Classification Search
CPC ........... H04N 21/23106; H04N 21/232; H04N 21/2393
See application file for complete search history.

(56) References Cited

U.S. PATENT DOCUMENTS

| 2016/0269458 A1* | 9/2016 | Mandyam ............. H04L 65/752 |
| 2021/0329351 A1 | 10/2021 | Giladi et al. |
| 2023/0007321 A1 | 1/2023 | Schildbach et al. |

OTHER PUBLICATIONS

Extended European Search Report issued in related application No. EP25155505.8 dated Jun. 16, 2025.
Information technology—Dynamic adaptive streaming over http (Dash)—Part 1: Media presentation description and segment formats, 2022, pp. 1-320, URL:https://api.iec.ch/harmonized/publications/download/3044726.

* cited by examiner

*Primary Examiner* — Mulugeta Mengesha
(74) *Attorney, Agent, or Firm* — Ballard Spahr LLP

(57) ABSTRACT

The present methods, systems, and apparatuses may provide for more efficient transmission and storage of initialization segments for individual content items that share a set of common parameters. Instead of generating initialization segments that are specific to each content item, a common initialization segment for the content items and/or an existing initialization segment for one of the content items may be used for initializing playback of one or more content segments for any of the content items sharing the set of common parameters.

20 Claims, 7 Drawing Sheets

METHODS, SYSTEMS, AND APPARATUSES FOR IMPROVED CONTENT STORAGE

BACKGROUND

Content items provided via a content delivery network (CDN) may be associated with various files and other data that facilitate output at end user devices. As the number of available content items continues to increase, the various files and other data associated with each individual content item may lead to network-related and/or storage-related issues for the CDN as well as for associated networks and devices.

SUMMARY

It is to be understood that both the following general description and the following detailed description are exemplary and explanatory only and are not restrictive. Methods, systems, and apparatuses for improved content storage are described herein. In some examples, the present methods, systems, and apparatuses may provide for more efficient generation, transmission, and/or storage of initialization segments, which are used to initialize playback of content items (e.g., video content). For example, content items associated with a given codec, format, standard, etc., may be encoded and/or output according to a set of common parameters shared by each of those content items, and corresponding initialization segments for each of those content items may be largely similar.

Instead of generating initialization segments that are specific to each content item (and potentially to each individual request of each content item), a common initialization segment for the content items and/or an existing initialization segment for one of the content items may be used for initializing playback of any content segment for any of those content items sharing the set of common parameters-even across different channels. In this way, a single common initialization segment may be provided when responding to requests for content segments associated with any of those content items-even if the common initialization segment was generated for (e.g., intended to be used for) a specific one of those content items and/or a specific channel. And existing initialization segments that may have been previously generated may be de-duplicated.

Additionally, manifest files (or a portion(s) thereof) associated with the content items may be modified to include a reference to the common initialization segment, such as by replacing a reference to a previously-generated initialization segment that is specific to the particular content item (or portion(s) thereof). Other examples are possible as well. This summary is not intended to identify critical or essential features of the disclosure, but merely to summarize certain features and variations thereof. Other details and features will be described in the sections that follow.

BRIEF DESCRIPTION OF THE DRAWINGS

In order to provide understanding techniques described, the figures provide non-limiting examples in accordance with one or more implementations of the present disclosure, in which.

DETAILED DESCRIPTION

Figure 1A:
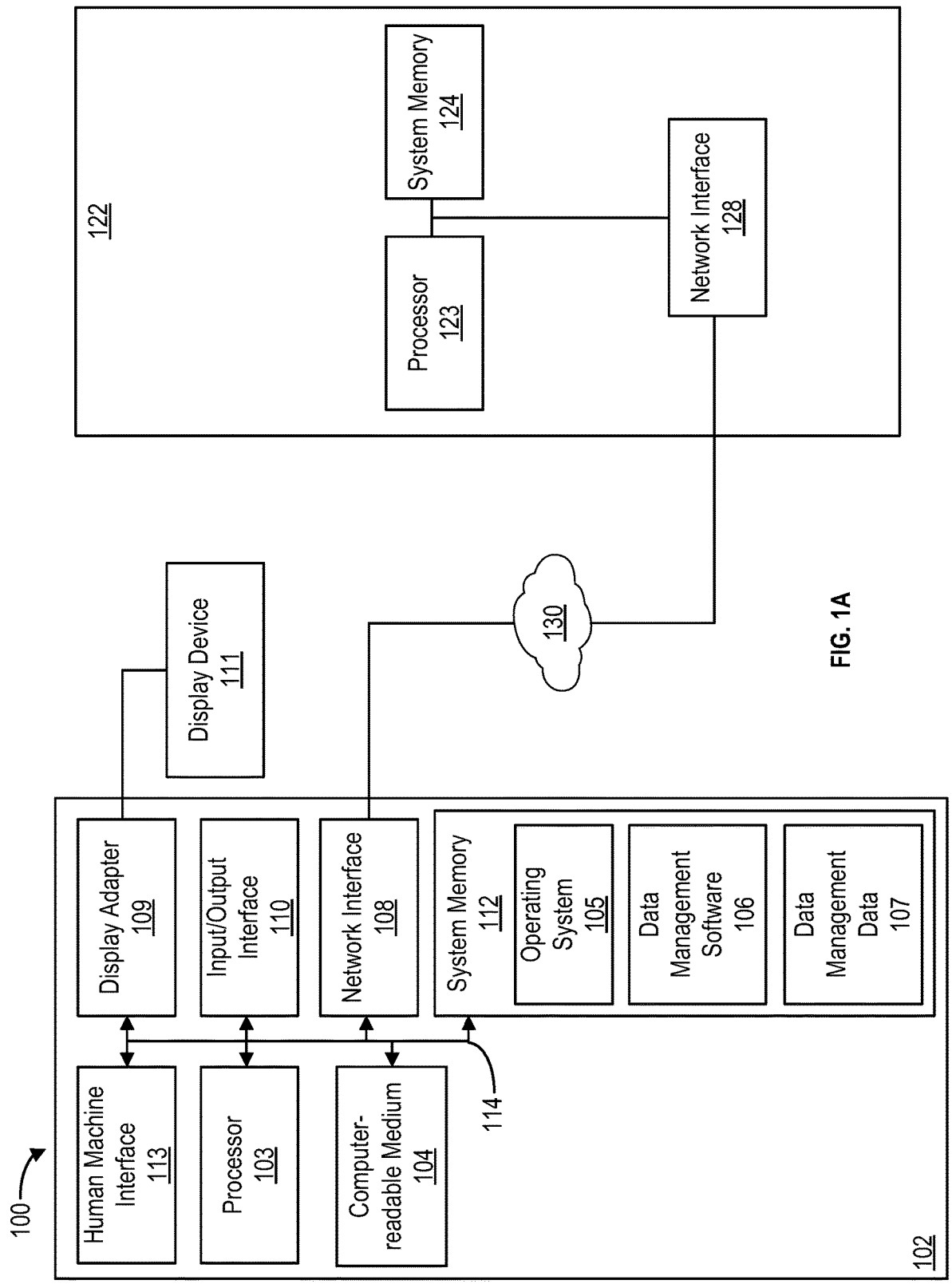
FIG. 1A shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intended to be limited to the four corners of each sheet presented. The techniques disclosed herein may be implemented on a computing device in a way that improves the efficiency of its operation. As an example, the methods, instructions, and steps disclosed herein may improve the functioning of a computing device.

Methods, apparatuses, and systems for improved content storage are described herein. FIG. 1A shows an example system 100 that may be configured in accordance with one or more applications of the methods, systems, and apparatuses described herein. The system 100 may comprise a user device 102. The user device 102 may comprise one or more processors 103, a system memory 112, and a bus 114 that couples various components of the user device 102 including the one or more processors 103 to the system memory 112. In the case of multiple processors 103, the user device 102 may utilize parallel computing.

The bus 114 may comprise one or more of several possible types of bus structures, such as a memory bus, memory controller, a peripheral bus, an accelerated graphics port, and a processor or local bus using any of a variety of bus architectures.

The user device 102 may operate on and/or comprise a variety of user device readable media (non-transitory). User device readable media may be any available media that is accessible by the user device 102 and comprises, non-transitory, volatile and/or non-volatile media, removable and non-removable media. The system memory 112 has user device readable media in the form of volatile memory, such as random access memory (RAM), and/or non-volatile memory, such as read only memory (ROM). The system memory 112 may store data such as data 107 and/or programs such as operating system 105 and software 106 that are accessible to and/or are operated on by the one or more processors 103.

The user device 102 may also comprise other removable/non-removable, volatile/non-volatile user device storage media. The computer-readable medium 104 may provide non-volatile storage of user device code, user device readable instructions, data structures, programs, and other data for the user device 102. The computer-readable medium 104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of programs may be stored on the computer-readable medium 104. An operating system 105 and software 106 may be stored on the computer-readable medium 104. One or more of the operating system 105 and software 106 (e.g., mobile applications), or some combination thereof, may comprise program and the software 106. Data 107 may also be stored on the computer-readable medium 104. Data 107 may be stored in any of one or more databases known in the art. The databases may be centralized or distributed across multiple locations within the network 130.

A user may enter commands and information into the user device 102 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 103 via a human machine interface 113 that is coupled to the bus 114, but may be connected by other interface and bus structures, such as a parallel port, game port, an IEEE 1394 Port (also known as a Firewire port), a serial port, network interface 108, and/or a universal serial bus (USB).

A display device 111 may also be connected to the bus 114 via an interface, such as a display adapter 109. It is contemplated that the user device 102 may have more than one display adapter 109 and the user device 102 may have more than one display device 111. A display device 111 may be a monitor, an LCD (Liquid Crystal Display), light emitting diode (LED) display, television, smart lens, smart glass, and/or a projector. In addition to the display device 111, other output peripheral devices may comprise components such as speakers (not shown) and a printer (not shown) which may be connected to the user device 102 via Input/Output Interface 110. Any step and/or result of the methods may be output (or caused to be output) in any form to an output device. Such output may be any form of visual representation, including, but not limited to, textual, graphical, animation, audio, tactile, and the like. The display device 111 and user device 102 may be part of one device, or separate devices.

The user device 102 may operate in a networked environment using logical connections to one or more computing devices 122. A computing device 122 may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the user device 102 and a computing device 122 may be made via a network 130. Such network connections may be through a network interface 108. A network interface 108 may be implemented in both wired and wireless environments.

Application programs and other executable program components such as the operating system 105 are shown herein as discrete blocks, although it is recognized that such programs and components may reside at various times in different storage components of the user device 102, and are executed by the one or more processors 103 of the user device 102. The computing device 122 may include all of the components described with regard to the user device 102.

The user device 102 is configured to communicate over a network interface 108. The network interface 108 may be configured with a radio or other electromagnetic spectrum transceiver. The network interface 108 may be combined with a SIM, and identification numbers (e.g., international mobile subscriber identity, local area identity) and keys therein (e.g., ki), for secure communications.

The user device 102 may communicate with the computing device 122 over a network 130. Such communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Figure 1B:
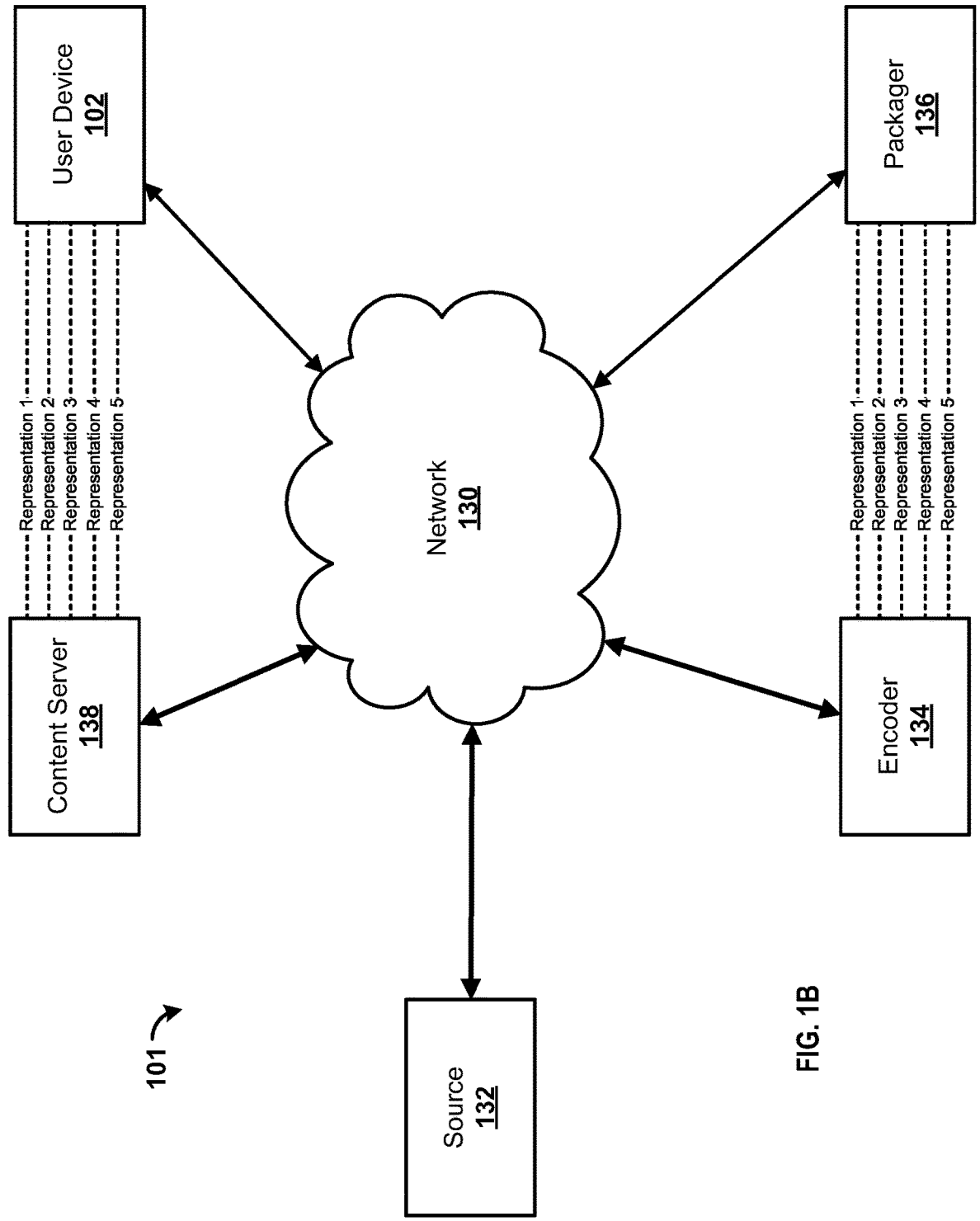
FIG. 1B shows an example system.

Turning now to FIG. 1B, FIG. 1B shows an example variant of the system 100 shown in FIG. 1A (referred to herein as the "system 101"). The system 101 may comprise a plurality of computing devices/entities in communication via the network 130. The network 130 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 130 via a variety of transmission paths, including wireless paths (e.g., satellite paths, Wi-Fi paths, cellular paths, etc.) and terrestrial paths (e.g., wired paths, a direct feed source via a direct line, etc.). The network 130 may comprise public networks, private networks, wide area networks (e.g., Internet), local area networks, and/or the like. The network 130 may comprise a content access network, content distribution network, and/or the like. The network 130 may be configured to provide content from a variety of sources using a variety of network paths, protocols, devices, and/or the like. The content delivery network and/or content access network may be managed (e.g., deployed, serviced) by a content provider, a service provider, and/or the like. The network 130 may deliver content items from a source(s) to a client device(s)/user device(s).

The system 101 may comprise a source 132, such as a server(s) or other computing device(s) (e.g., the computing device 122 of FIG. 1A). The source 132 may receive source streams for a plurality of content items. The source streams may be live streams (e.g., a linear content stream) and/or video-on-demand (VOD) streams. The live streams may comprise, for example, "regular" or low-latency ("LL") live streams. The source 132 may receive the source streams from an external server or device (e.g., a stream capture source, a data storage device, a media server, etc.). The source 132 may receive the source streams via a wired or wireless network connection, such as the network 130 or another network (not shown).

The source 132 may comprise a headend, a video-on-demand server, a cable modem termination system, and/or the like. The source 132 may provide content (e.g., video, audio, games, applications, data) and/or content items (e.g., video, streaming content, movies, shows/programs, etc.) to client devices (e.g., user devices). The source 132 may provide streaming media, such as live content, on-demand content (e.g., video-on-demand), content recordings, and/or the like. The source 132 may be managed by third-party content providers, service providers, online content providers, over-the-top content providers, and/or the like. A content item may be provided via a subscription, by individual item purchase or rental, and/or the like. The source 132 may be configured to provide content items via the network 130. Content items may be accessed by client devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like. The source 132 may provide uncompressed content items, such as raw video data, comprising one or more portions (e.g., frames/slices, groups of pictures (GOP), coding units (CU), coding tree units (CTU), etc.). It should be noted that although a single source 132 is shown in FIG. 1B, this is not to be considered limiting. In accordance with the described techniques, the system 101 may comprise a plurality of sources 132, each of which may receive any number of source streams.

The system 101 may comprise an encoder 134, such as a video encoder, a content encoder, etc. (e.g., the computing device 122 of FIG. 1A). The encoder 134 may be configured to encode one or more source streams (e.g., received via the source 132) into a plurality of content items/streams at various bitrates (e.g., various representations). For example, the encoder 134 may be configured to encode a source stream for a content item at varying bitrates for corresponding representations (e.g., versions) of a content item for adaptive bitrate streaming. An encoded content item may include a plurality of frames (e.g., a series of frames/pictures/portions, etc.). The plurality of frames may comprise a plurality of I-slices, P-slices, and/or B-slices, each slice representing a rectangular area within a picture. An I-slice (e.g., an Intra-coded frame/picture) may include and/or represent a complete image/picture (or a rectangular area within it). A P-slice (e.g., a Predicted picture/delta frame) may comprise only the changes in an image from one or more previous frames. A B-slice (e.g., a Bidirectional predicted picture) may comprise only the differences between a current frame and both preceding and following frames (in presentation order).

As shown in FIG. 1B, the encoder 134 may encode a source stream into Representations 1-5. It is to be understood that the FIG. 1 shows five representations for explanation purposes only. The encoder 134 may be configured to encode a source stream into fewer or greater representations.

Representation 1 may be associated with a first resolution (e.g., 480p) and/or a first bitrate (e.g., 2 Mbps). Representation 2 may be associated with a second resolution (e.g., 720p) and/or a second bitrate (e.g., 3.5 Mbps). Representation 3 may be associated with a third resolution (e.g., 1080p) and/or a third bitrate (e.g., 6 Mbps). Representation 4 may be associated with a fourth resolution (e.g., 4K) and/or a first bitrate (e.g., 18 Mbps). Representation 5 may be associated with a fifth resolution (e.g., 8K) and/or a fifth bitrate (e.g., 45 Mbps). Other example resolutions and/or bitrates are possible. Note that "Representation" is a term defined for MPEG DASH (ISO/IEC 23009-1), while Apple HTTP Live Streaming (IETF RFC 8216) (hereinafter, "HLS") defines the same concept as a "variant," and the present methods, systems, and apparatuses are not intended to be limited to DASH-based environments/use cases.

The system 101 may comprise a packager 136 (e.g., the computing device 122 of FIG. 1A). The packager 136 may be configured to receive one or more content items/streams from the encoder 134. The packager 136 may be configured to prepare content items/streams for distribution. For example, the packager 136 may be configured to convert encoded content items/streams into a plurality of content fragments. The packager 136 may be configured to provide content items/streams according to adaptive bitrate streaming. For example, the packager 136 may be configured to convert encoded content items/streams at various representations into one or more adaptive bitrate streaming formats, such as HLS, Microsoft Smooth Streaming, Adobe HTTP Dynamic Streaming (HDS), MPEG DASH, any media streaming format based on the TCP or reliable UDP (e.g. QUIC) transport protocol, driven by client requests, and/or the like. The description herein may use terms that correspond to MPEG DASH, however, it is to be understood that the methods and systems described herein are equally applicable to HLS and/or any other similar media streaming format. The packager 136 may pre-package content items/streams and/or provide packaging in real-time as content items/streams are requested by client devices, such as the user device 102. The user device 102 may be a content/media player, a television, a computer, a set-top box, a smart device, a mobile device, etc.

The system 101 may comprise a content server 138 (e.g., the computing device 122 of FIG. 1A). The content server 138 may be configured to receive requests for content, such as content items/streams. The content server 138 may identify a location of a requested content item and provide the content item—or a portion thereof—to a device requesting the content, such as the user device 102. The content server 138 may comprise a Hypertext Transfer Protocol (HTTP) Origin server. The content server 138 may be configured to provide/facilitate a communication session with a requesting device, such as the user device 102, based on HTTP, FTP, or other protocols. The content server 138 may be one of a plurality of content server distributed across the system 101. The content server 138 may be located in a region proximate to the user device 102. A request for a content stream/item from the user device 102 may be directed to the content server 138 (e.g., due to the location and/or network conditions). The content server 138 may be configured to deliver content streams/items to the user device 102 in a specific format requested by the user device 102. The content server 138 may be configured to provide the user device 102 with a manifest file (e.g., or other index file describing portions of the content) corresponding to a content stream/item. The content server 138 may be configured to provide streaming content (e.g., unicast, multicast) to the user device 102. The content server 138 may be configured to provide a file transfer and/or the like to the user device 102. The content server 138 may cache or otherwise store content (e.g., frequently requested content) to enable faster delivery of content items to users.

The content server 138, as well as other entities of the system 101, may use various protocols for serving content items to requesting devices, such as Dynamic Adaptive Streaming over HTTP (DASH), LL-DASH, LL-HLS, Smooth Streaming, and codecs such as ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC), MPEG EVC, MPEG LC-EVC, AOM AV1, VP9, or any other video file format, whether such format is presently known or developed in the future.

The content server 138 may receive a request for a content item, such as a request for high-resolution video and/or the like. The content server 138 may receive requests for content items from the user device 102. As further described herein, the content server 138 may be capable of sending (e.g., to the user device 102) one or more portions of a requested content item at varying bitrates (e.g., Representations 1-5). For example, the user device 102 (or another device of the system 101) may request that the content server 138 send Representation 1 based on a first set of network conditions (e.g., estimate of available bandwidth, throughput, etc.). As another example, the user device 102 (or another device of the system 101) may request that the content server 138 send Representation 5 based on a second set of network conditions (e.g., higher levels of bandwidth, throughput, etc.). The content server 138 may receive encoded/packaged portions of the requested content item from the encoder 134 and/or the packager 136 and send (e.g., provide, serve, transmit, etc.) the encoded/packaged portions of the requested content item to the user device 102. Other examples are possible as well.

Content received from the source 132 may be fragmented into constituent segments (e.g., DASH-conforming content segments). An initialization segment for a particular content item may be used to provide information, such as for the user device 102, related to output of the content item. The initialization segment may be smaller-sized relative to other segments containing audio and/or video content (e.g., content frames, segments, etc.).

In existing systems, initialization segments may be generated and stored for each content item available—and potentially for each recording as the case may be. For example, in existing systems, for a single-period content item, there may be 16 initialization segments (e.g., 12 for video, 2 for main audio, 2 for accessibility audio, if we assume a bitrate ladder comprising 12 video representations and 2 audio languages). Thus, if 1,000 linear channels are served concurrently, 16,000 initialization segments may be required by such existing systems. Additionally, each such initialization segment is a potential source of a cache miss, since an upstream device may request a particular initialization not requested before and hence not available at a closest available cache, server, node, etc.

The system 100 may overcome the challenges these existing systems encounter with respect to generation, storage, and use of initialization segments. Much of the information within initialization segments for content items that share a plurality of common parameters may be redundant with respect to other initialization segments for other content items sharing the same plurality of common parameters.

For example, initialization segments may be largely similar from an output perspective, such as initialization segments for each of Representations 1-5 for an example content item as shown in FIG. 1B. Moreover, entirely different content items may have largely similar initialization segments, such as for content items sharing a plurality of common parameters. For example, initialization segments might be reusable across representations comprising different linear/live content items (e.g., such as different TV channels). Such initialization segments might be reusable for different content items—and across different channels, because encoder settings, specifications, etc., associated with a same set of channels, feeds, streams, etc., generally remain consistent across different content items. For example, encoder settings, specifications, etc., may generally remain consistent across different linear/live channels within a slate of channels provided by a same video service provider, content provider, Multichannel Video Programming Distributor ("MVPD"), content distribution network ("CDN"), and/or the like.

Such encoder settings, specifications, etc., which may be referred to herein collectively as "common parameters," may include, as examples only, information indicative of and/or comprising a codec, a resolution, a bitrate, a frame rate, track identifiers, etc. Moreover, the individual values for each of those common parameters generally remain valid across different content items and segments as well as across different channels. As a result, associated initialization data stored within, and/or referenced by, the initialization segments may remain valid throughout a corresponding broadcast, duration, etc., for those content items.

To use the example above of 1,000 linear channels, and assuming similarly-configured encoders, out of 16,000 initialization segments that may be generated for the 1,000 linear channels, only 16 of those initialization segments may deviate from an otherwise largely similar group of initialization segments. Maintaining so many redundant initialization segments may burden infrastructure and processing times, such as when two-tiered storage systems are used (e.g., fast RAM-based storage and slower high-capacity magnetic storage. For example, requests for initialization segments may be made to the slower storage, which may result in both higher load on the storage system (e.g., in terms of both storage and I/O operations) and slower response times. These issues may multiply with unique copy storage requirements (e.g., digital video recorder-unique copy requirements) because each linear channel may have tens of thousands of recordings, all of which may share the common parameters (e.g., codecs, resolutions, framerate, bitrates, etc.). As another example, using redundant initialization segments may lead to latency issues, such as when a requested initialization segment is not available at a nearest distribution point (e.g., an edge cache of a CDN) and must be requested from an upstream source, which may lead to additional "cache misses" potentially all the way up to a top node of the CDN, such as an origin device/server that provides a corresponding source feed (e.g., the source 132 and/or the content server 138 of the system 100).

In the context of adaptive streaming (e.g., DASH, HLS, etc.), an initialization segment provides metadata needed for successful playback initialization of a plurality of content segments comprising, associated with, and/or within a single representation (e.g., one of Representations 1-5 shown in FIG. 1). Note that although an initialization segment provides metadata needed for successful playback, the same initialization segment may never contain any timed data (including media/content-specific data). An initialization segment generated for a content segment associated with a first content item and a first channel may be used to initialize playback of a content segment associated with a different content item (and potential many others), even if associated with/broadcast via a different channel, so long as those content items are encoded for a same representation level, as encoder settings/parameters (e.g., a plurality of common parameters) for a given representation level generally remain the same-even across channels. Put differently, an initialization segment for a particular representation level generally remains valid for initializing playback of content segments encoded at that same representation level throughout a corresponding broadcast, duration, etc., for those content items-even across different channels.

As described above, the system 100 may generate a manifest file for each available content item. A manifest file for a content item may facilitate access to a respective plurality of segments of the content item for one or more of a plurality of representations (e.g., Representations 1-5). The manifest file may be generated as a tree or other hierarchy of elements. For example, the manifest file may include one or more period elements that each describe a particular period/duration of the content item (e.g., a duration of the content item bound by a start time and an end time). Each period element may include, as a child element, one or more adaptation sets—each of which may include one or more representation elements that each identify a particular representation of the content item available during that period/duration (e.g., Representations 1-5). Each of the representation elements may describe various attributes of the corresponding representation of the content item, allowing for downstream devices, such as the user device 102 to select a particular representation for output.

In certain circumstances, a manifest file for a content item may comprise values (or simply reference such values) for one or more parameter(s)/field(s) within an adaptation set within a first period that are technically compatible with (e.g., valid for) values for the same one or more parameter(s)/field(s) within an adaptation set within a second period. In such circumstances, values for initialization data stored within and/or referenced by initialization segments for each of the corresponding representations, which are child elements of adaptation sets, may be functionally equivalent. That is, values for initialization data stored within and/or referenced by an initialization segment associated with a content segment(s) associated with the second period may be used to initialize playback of a content segment(s) associated with the first period, so long as the representation to be used is identified in each of the adaptation sets associated with each period. If so, then the values for the initialization data for the initialization segment associated with the second period may be valid to use in place of the values for the initialization segment associated with the first period. This may occur, for example, when a same encoder(s), such as the encoder 134, is used to encode segments of the content item using consistent encoding settings/parameters (e.g., a plurality of common parameters) as described herein.

The system 100 may benefit, such as from a computational and/or networking standpoint, by reducing the number of initialization segments that are generated, used, and/or stored at scale by, for example, taking advantage of the similarities across representations described above. For example, since encoder settings, specifications, etc., associated with a same set of channels, feeds, streams, etc., generally remain consistent across different content items, the system 100 may be configured to generate initialization segments that may be reusable for different linear/live content items across different channels (e.g., a slate of channels provided by a same video service provider, content provider, Multichannel Video Programming Distributor ("MVPD"), content distribution network ("CDN"), and/or the like). Such encoder settings, specifications, etc., may be referred to collectively as "a plurality of common parameters," and individual values for each of those common parameters may remain valid across different content segments, different content items, and even different channels.

In some examples, the system 100 may use a single initialization segment to initialize output (e.g., at downstream/client devices) of one or more portions of content items that share the plurality of common parameters (e.g., one or more parameters identified in initialization segments), even if they are associated with different channels. Data related to the plurality of common parameters may represent the majority of data stored in each individual initialization segment associated with those content items and channels. Thus, using a single initialization segment when possible will result in significant computational, storage, and network related savings at scale.

As an example, and as further described herein, the system 100 may generate initialization segments for each of a plurality of content items via one or more of the encoder 134, the packager 136, or the content server 138. The plurality of content items may be associated with a plurality of channels (e.g., a plurality of linear channels), a same encoding device(s), a same source(s), a same content type, a combination thereof, and/or the like. Additionally, or in the alternative, the plurality of content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like.

Each initialization segment for each of the plurality of content items may comprise a plurality of common parameters. The plurality of common parameters may be related to output and/or decoding of at least one of the plurality of content items; however, no parameter within the plurality of common parameters may have a material impact on the output and/or decoding of the corresponding content item. For example, the plurality of common parameters may be associated with, and/or comprise, a file type, a video width, a video height, a frame rate, a profile/level/tier, a sequence parameter, a picture parameter, a quantization parameter, a timescale, a duration, a creation time, a file format, a codec, digital rights management ("DRM") information (e.g., a DRM key identifier(s) and/or DRM license identifier/information, if a same entitlement(s)/right(s) is shared across multiple channels), a combination thereof, and/or the like. The plurality of common parameters may be shared by (e.g., common among) each content item of the plurality of content items. The plurality of common parameters may be associated with one or more elements of one or more adaptation sets associated with the plurality of content items.

To facilitate (and/or improve) such usage of initialization segments for a particular plurality of content items, the system 100 may be particularly configured in one or more ways. For example, the encoder 134 may be provided with specific or default values to be used as values for one or more parameters, fields, elements, etc., of initialization segments generated for any content item of the plurality of content items. The one or more parameters, fields, elements, etc., may be one or more of the "plurality of common parameters" described above and throughout. In other words, the encoder 134 may be configured such that one or more common parameters of the plurality of common parameters, stored within and/or referenced by the corresponding initialization segments are populated with the specific or default values noted above instead of content item-specific values that may not be valid across all content segments/content items. The specific or default values provided to the encoder 134 may comprise and/or be associated with a sequence parameter set, a picture parameter set, a quantization parameter a codec, a combination thereof, and/or the like.

As a result of such configuration, the encoder 134 may generate "normalized" (or "common") initialization segments that may be used to initialize playback for any content segment for any content items of the plurality of content items for which the specific or default values used for the plurality of common parameters are valid. In some examples, as part of configuring the encoder 134 with the specific or default values, any existing data related to content segments and/or manifest files previously generated for the plurality of content items using differing values with respect to the specific or default values may need to be modified (e.g., metadata may be need to be modified) to ensure the "normalized" initialization segment(s) generated using the specific or default values may be used to initialize playback of those existing content segments. For example, if the specific or default values provided comprise and/or are associated with a values(s) for a picture parameter set (e.g., a "pps_id" field), then the corresponding value(s) associated with any existing data related to content segments and/or manifest files may need to be modified to ensure the "normalized" initialization segment(s) using the specific or default values may be used to initialize playback.

As another example of how the system 100 may be particularly configured, the packager 136 may be provided with additional specific or default values to be used as values for one or more additional parameters, fields, elements, etc., of the initialization segments generated for any content item of the plurality of content items. The one or more additional parameters, fields, elements, etc., may be one or more of the "plurality of common parameters" described above and throughout. The specific or default values provided to the packager 136 may comprise and/or be associated with a timescale, a duration, a creation time, a file format, a file type, a codec, a combination thereof, and/or the like.

In other words, the packager 136 may be configured such that one or more common parameters, of the plurality of common parameters, stored within and/or referenced by the corresponding initialization segments are populated with the additional specific or default values noted above instead of content item-specific values that may not be valid across all content segments/content items. For example, an initialization segment for a first content item of the plurality of content items may have been generated by the encoder 134, and existing values stored within and/or referenced by that initialization segment for one or more first common parameters of the plurality of common parameters may be replaced with the additional specific or default values provided to the packager 136. Thus, the values for the one or more first common parameters that the packager 136 may modify may comprise and/or be associated with the specific or default values for timescale, duration, creation time, file format, file type, codec, a combination thereof, and/or the like, provided to the packager 136.

As another or further example, the packager 136 may normalize/modify an order/arrangement/sequence of the one or more first common parameters within that initialization segment in a consistent manner, such as by replacing an indication of a particular ISO base media file format ("ISO-BMFF") (e.g., an indication of "ISO6" stored in a "ftyp" field box within the initialization segment) with another ISO-BMFF that may be cross- and/or backwards-compatible (e.g., replace the indication of "ISO6" with "ISO9"). Other examples to maintain consistent generation of fields/data within the initialization segment are possible as well.

Additionally, or in the alternative, the system 100 may be configured to normalize initialization segments associated with a same adaptation set based on a normalized initialization segment for a highest-available representation (e.g., the representation with a highest profile/level, a highest resolution, and/or a highest frame rate. For example, the system 100 may normalize the initialization segments associated with the same adaptation set based on the normalized initialization segment for the highest-available representation by using values for the plurality of common parameters stored within and/or referenced by the normalized initialization segment for the highest-available representation for corresponding values within the other initialization segments associated with the same adaptation set. Moreover, if a same packaging method is used for the corresponding content segments (e.g., AVC3, HEV1, etc.), then any of the normalized initialization segments for any representation below/less than the highest-available representation may be discarded, permitted to be removed from cache, etc. This is because the normalized initialization segments for the highest-available representation may be used to initialize playback of content segments associated with any of the representations that are below/less than the highest-available representation when the same packaging method. As described in additional detail herein, generating (and/or modifying) initialization segments as described above may assist in de-duplicating one or more groups of largely identical, and thus redundant, initialization segments.

Figure 2:
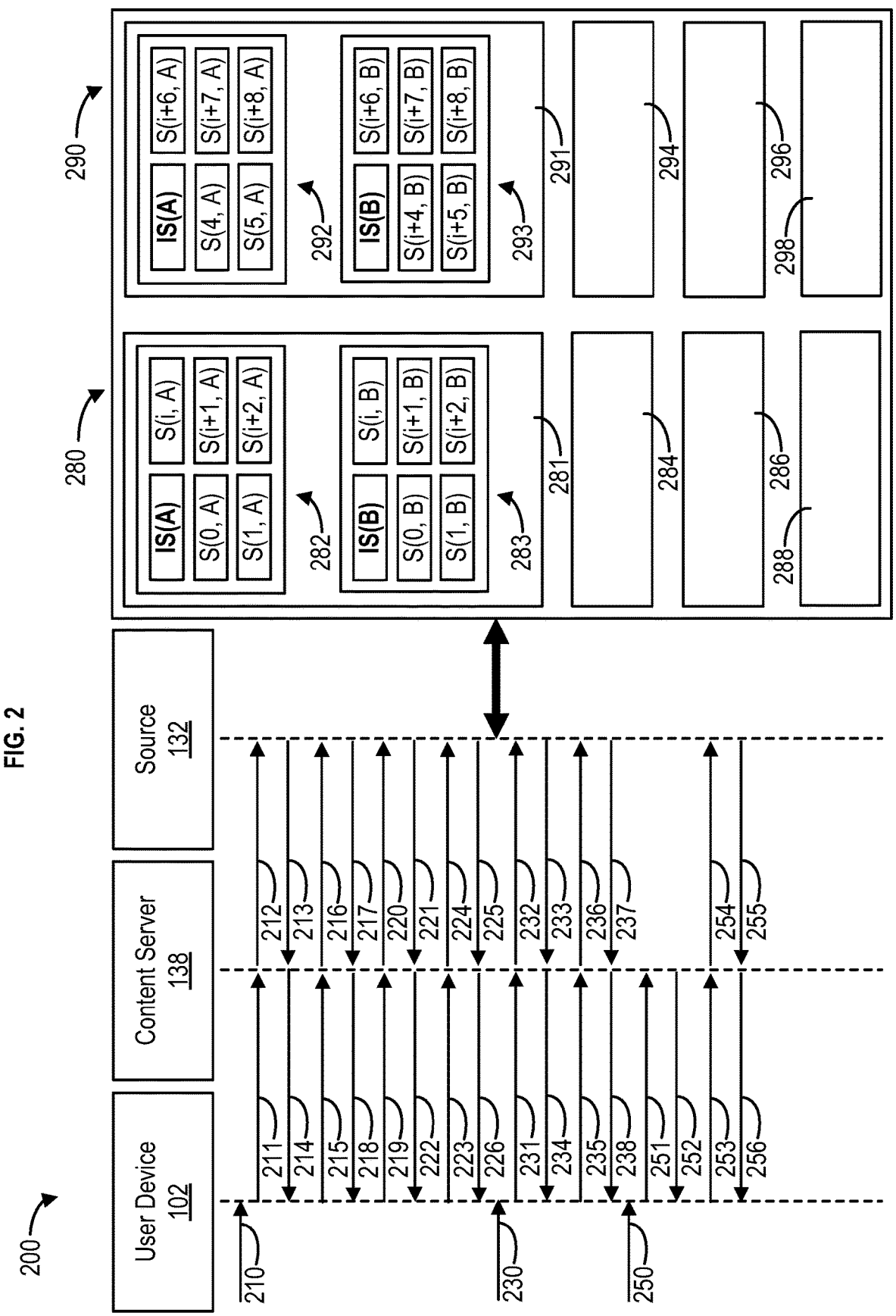
FIG. 2 shows an example communication architecture.

Referring to FIG. 2, an example communication architecture 200 in accordance with one or more implementations of the of the methods, systems, and apparatuses described herein is shown. For example, as shown in FIG. 2, the communication architecture 200 may comprise the user device 102, the content server 138, and the source 132. content server 138 source 132. A source stream(s) for an example content item may be received via the source 132, stored at the content server 138 as encoded segments, and made available to the user device 102 content server 138. The content may be associated with more than one version (e.g., representation A, representation B). Each version or representation may be characterized by a different bitrate/resolution (e.g., representation A having a first bitrate, representation B having a second bitrate, with the first or second bitrate higher than the other).

The content item may be associated with a manifest file that facilitates the user device 102 requesting and subsequently outputting one or more segments of the content item. The manifest file may comprise, as shown in FIG. 2, a first portion 280 associated with a first period (e.g., a playback period) and a second portion 290 associated with a second period. The first portion 280 may comprise adaptation sets 281, 284, 286, 288. Each of the adaptation sets 281, 284, 286, 288 may comprise one or more representations (e.g., representations A, B). For example, the adaptation set 281 may include a first representation 282 (e.g., representation A) and a second representation 283 (e.g., representation B). Each of the representations may be associated with an initialization segment, shown in FIG. 2 with a bold "IS (A)" label (e.g., Initialization Segment for Representation A).

At step 210, the user device 102 may receive a request to output a portion of the content item associated with the first portion 280 shown in FIG. 2, such as a content segment within the first period. The user device 102 may request an initialization segment (e.g., IS (A)) associated with the portion of the content item (the content segment) in step 211. For example, the user device 102 may send an HTTP GET request for the initialization segment associated with the first representation 282. The HTTP GET request may be fulfilled by content server 138 or forwarded by the content server 138 to another content source (not shown) or the source 132 in step 212. The initialization segment associated with the first representation 282 may be sent to the user device 102 in steps 213, 214 via the source 132 and the content server 138, respectively.

After receiving the initialization segment, the user device 102 may request the actual content segment. For example, another HTTP GET request may be sent from the user device 102 to the content server 138, or another entity, to retrieve the content segment in step 215. In step 216, The HTTP GET request may be fulfilled by content server 138 or another server, cache, etc. The content segment (e.g., segment S(i, A)), where i is the index of the segment and A is the representation (e.g., bitrate) of the segment, may be forwarded to user device 102 in steps 217, 218 via the source 132 and the content server 138, respectively. A similar process may occur for the content segments i+x (e.g., i+1, i+2) in steps 219, 220, 221, 222 and steps 223, 224, 225, 226.

The user device 102, or another entity, may request a change from the first representation 282 to the second representation 283 during output of the content item at 230. The change request may be initiated by another HTTP GET request in step 231 for an initialization segment associated with the corresponding content segment (e.g., based on timestamp and request time) at representation B. The HTTP GET request may be received by content server 138 or another entity of the system 100 in step 231. The content server 138 may receive the request and determine the initialization segment for the corresponding content segment is not presently stored in cache (e.g., stored at the content server 138 and/or at a storage medium in communication therewith). For example, the content server 138 may receive the request, which may comprise an identifier for the corresponding content segment, and determine (e.g., based on format, convention, etc., related to the content item and/or output format) that the initialization segment for the corresponding content segment is not presently stored in cache. The determination may be based on a comparison of a unique identifier for the initialization segment to a plurality of unique identifiers associated with a plurality of content items and/or a plurality of content segments for one or more content items (e.g., stored in cache and/or at any suitable storage medium associated with the system 100).

For example, and as further described herein, the content server 138 (and/or any other entity of the system 100) may generate a unique identifier for any/all requested initialization segment(s) based on a plurality of common parameters. For example, the plurality of common parameters may be associated with, and/or comprise, a file type, a video width, a video height, a frame rate, a profile/level/tier, a sequence parameter, a picture parameter, a quantization parameter, a timescale, a duration, a creation time, a file format, a codec, a combination thereof, and/or the like. The plurality of common parameters may be associated with one or more elements of one or more adaptation sets associated with the plurality of content items. The content server 138 may compare the unique identifier for the initialization segment for the corresponding content segment to the plurality of unique identifiers. The content server 138 may, based on the comparison, determine that the actual initialization segment for the corresponding content segment (e.g., the file/data itself) is not presently stored in cache (e.g., stored at the content server 138 and/or at a storage medium in communication therewith).

Due to this "cache miss," the content server 138 may forward the request for the initialization segment to the source 132 at step 232. The source 132 may provide the initialization segment to the content server 138 at step 232, and the user device 102 may receive the initialization segment via the source 132 and the content server 138 at step 233, 234, respectively. Additionally, or in the alterative, one or more of the content server 138, the packager 136, or the encoder 134 may generate the initialization segment. A similar process may occur for the corresponding content segment itself i+x (e.g., i+3) in steps 235, 236, 237, 238.

The period associated with the second portion 290 of the manifest file may include the next chronological or sequential segment(s) with associated initialization segments. The second portion 290 may comprise adaptation sets 291, 294, 296, 298. Each of the adaptation sets 291, 294, 296, 298 of may comprise one or more representations that correspond to the one or more representations associated with the adaptation sets 281, 284, 286, 288 (e.g., representations A, B). For example, the adaptation set 291 may include a first representation 292 that corresponds to the first representation 282 (e.g., representation A) and a second representation 293 that corresponds to the second representation 283 (e.g., representation B). At step 250, a portion of the content item associated with the second period and the second portion 290 of the manifest file may be requested, such as a content segment associated with the second period and the second representation 293. In step 251, the user device 102 may send another HTTP GET request for the initialization segment associated with that content segment associated with the second period and the second representation 293 (e.g., representation B).

The content item associated with the communication architecture 200 may be a content item within the plurality of content items described herein, each of which may be associated with a same plurality of common parameters used to initialize playback of corresponding segments. Additionally, or in the alternative, the content item associated with the communication architecture 200 may be a stored/recorded content item, or at least a portion thereof, (e.g., cDVR) associated with a same user device (or group of devices), a same user profile (or group of profiles), a same subscriber identifier (or group of subscriber identifiers), a combination thereof, and/or the like, so long as a same plurality of common parameters may be used to initialize playback of corresponding segments.

Accordingly, initialization segments for content segments associated with that same plurality of common parameters may be used to initialize output/playback of one another-even across different content items as described herein. For example, an initialization segment for a content segment associated with the second representation 283 and the second adaptation set 293 (e.g., "IS (A)" as shown in the first adaptation set 293) may be used to initialize output/playback of a further content segment associated with the second representation 283 and the second adaptation set 293 (e.g., the same "IS (A)" as shown in the first adaptation set 293). In this example, the plurality of common parameters associated with those two content segments may comprise one or more elements associated with the second representation 283 and/or the second adaptation set 293.

Therefore, an initialization segment that may be used to initialize output/playback of the further content segment may already be available at the content server 138 when the corresponding request is received at step 251. That is, the initialization segment that was previously sent to the user device 102 at step 234 for initializing output of the content segment associated with the second representation 283 and the second adaptation set 293 may be used to initialize output/playback of the further content segment, because the further content segment is also associated with the second representation 283 and the second adaptation set 293 (e.g., the same "IS (A)" as shown in the first adaptation set 281). As such, in step 252, that initialization segment may be sent to the user device 102. A similar process may occur for an additional segment(s) i+x (e.g., i+3) in steps 253, 254, 255, 256.

The generation, use, and storage of initialization segments by the system 100 as described herein allow several technical advantages to be realized-one of which relates to avoidance of cache misses. A cache miss occurs when a requested asset (e.g., a content item) is not available at a server/cache/computing device that receives a corresponding request for that asset. In the context of the system 100 and the communication architecture 200, a cache miss occurred at step 231 when the content server 138 determined that the initialization segment for the requested content segment was not presently stored in cache/available to be sent to the user device 102.

Due to the cache miss, the content server 138 forwarded the request for the initialization segment to the source 132 at step 232. However, as discussed above, the content server 138 was able to fulfill the request for the initialization segment requested at step 251 by sending the initialization segment previously sent to the user device 102 at step 234 for initializing output of the content segment associated with the same representation (the second representation 283) and the same adaptation set (the second adaptation set 293). This may allow (or cause) the content server 138 (or another entity of the system 100) to request the corresponding content segment (e.g., from the source 132). The corresponding content segment may be received, or otherwise be caused to become available for the user device 102 to request/receive, at or near the time the initialization segment is sent to the user device 102 at step 252. Moreover, because cache eviction rules generally permit frequently-requested files to remain in cache for longer than less-popular files, the initialization segments that may be used to initialize playback of multiple content segments as described herein may effectively remain in cache (e.g., the content server 138) virtually in perpetuity assuming the corresponding content item(s) remains popular.

To facilitate effective reuse of initialization segments as described herein, the system 100 may be configured to determine a unique identifier, such as a hash value, for each initialization segment that is generated. For example, the encoder 134, the packager 136, the content server 138, the source 132, and/or another entity of the system 100 (not shown) may be configured such that a first unique identifier was generated for the initialization segment sent to the user device 102 in steps 233, 234. The unique identifier may be (have been) generated at or near the same time the content server 138 determined that the initialization segment for the corresponding content segment was not presently stored in cache at step 231. The unique identifier may be generated and stored, such as at the content server 138 and/or in a cache or other storage device/medium in communication with the content server 138.

As discussed above, the content server 138 was able to fulfill the request for the initialization segment requested at step 251 by sending the initialization segment previously sent to the user device 102 at step 234. The content server 38 may be able to determine the initialization segment previously sent to the user device 102 at step 234 is available to be sent to the user device 102 to fulfill the request sent at step 251 (e.g., is available in cache) by comparing two unique identifiers. For example, the content server 138 may compare the first unique identifier, which was generated for the initialization segment sent to the user device 102 in steps 233, 234, to a second unique identifier and determining they match. The second unique identifier may correspond to the initialization segment requested at step 251, which the content server 138 may have generated based on the request. That is, the encoder 134, the packager 136, the content server 138, the source 132, and/or another entity of the system 100 (not shown) may be configured to generate a unique identifier for each initialization segment that is generated.

Such unique identifiers may be stored in one or more locations within the system 100, and the encoder 134, the packager 136, the content server 138, the source 132, and/or another entity of the system 100 (not shown) may be configured to perform a lookup operation each time a new initialization segment is to be generated. The lookup operation may include a comparison of a newly-generated unique identifier for a not-yet-generated initialization segment to a plurality of unique identifiers to determine whether any match the newly-generated unique identifier. In the event a match is found (e.g., steps 251,252), then the not-yet-generated initialization segment may not be generated at all and instead an initialization segment associated with a unique identifier that matches the newly-generated unique identifier may be provided/sent.

As described above regarding FIG. 2 and the communication architecture 200, an initialization segment for a first content segment associated with a first representation and a first adaptation set may be used to initialize playback of another content segment also associated with the first representation and the first adaptation set. In other words, the initialization segment for the first content segment may be used to initialize playback of the other content segment based on a plurality of common parameters present in both associated initialization segments. In the communication architecture 200, the content segments provided were all associated with a same content item, and therefore the corresponding plurality of common parameters are associated with one content item.

In other examples of the system 100, an initialization segment for a first content segment for a first content item may be used to initialize playback of another content segment(s) for another content item(s)—even if associated with a different channel, so long as the content segments share a corresponding plurality of common parameters. The content items may be associated with a same plurality of common parameters used to initialize playback of corresponding segments (e.g., common parameters that are valid across the segments). Additionally, or in the alternative, the content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like, so long as the same plurality of common parameters may be used to initialize playback of corresponding segments (e.g., common parameters that are valid across the segments).

The plurality of common parameters may be related to output and/or decoding, but no parameter within the plurality of common parameters may have a material impact on the output and/or decoding of any corresponding content item. For example, the plurality of common parameters may be associated with, and/or comprise, a file type, a video width, a video height, a frame rate, a profile/level/tier, a sequence parameter, a picture parameter, a quantization parameter, a timescale, a duration, a creation time, a file format, a codec, a combination thereof, and/or the like. The plurality of common parameters may be associated with one or more elements of one or more adaptation sets. Other examples are possible as well.

The relatedness of initialization segments for content items that are associated with a plurality of common parameters may allow the system 100 to realize additional technical advantages. For example, the lookup operation described above each time a new initialization segment is to be generated for any one particular content item may also be performed when any new initialization segment is to be generated for any content item. The system 100 may therefore use initialization segments across content items when possible.

Figure 3:
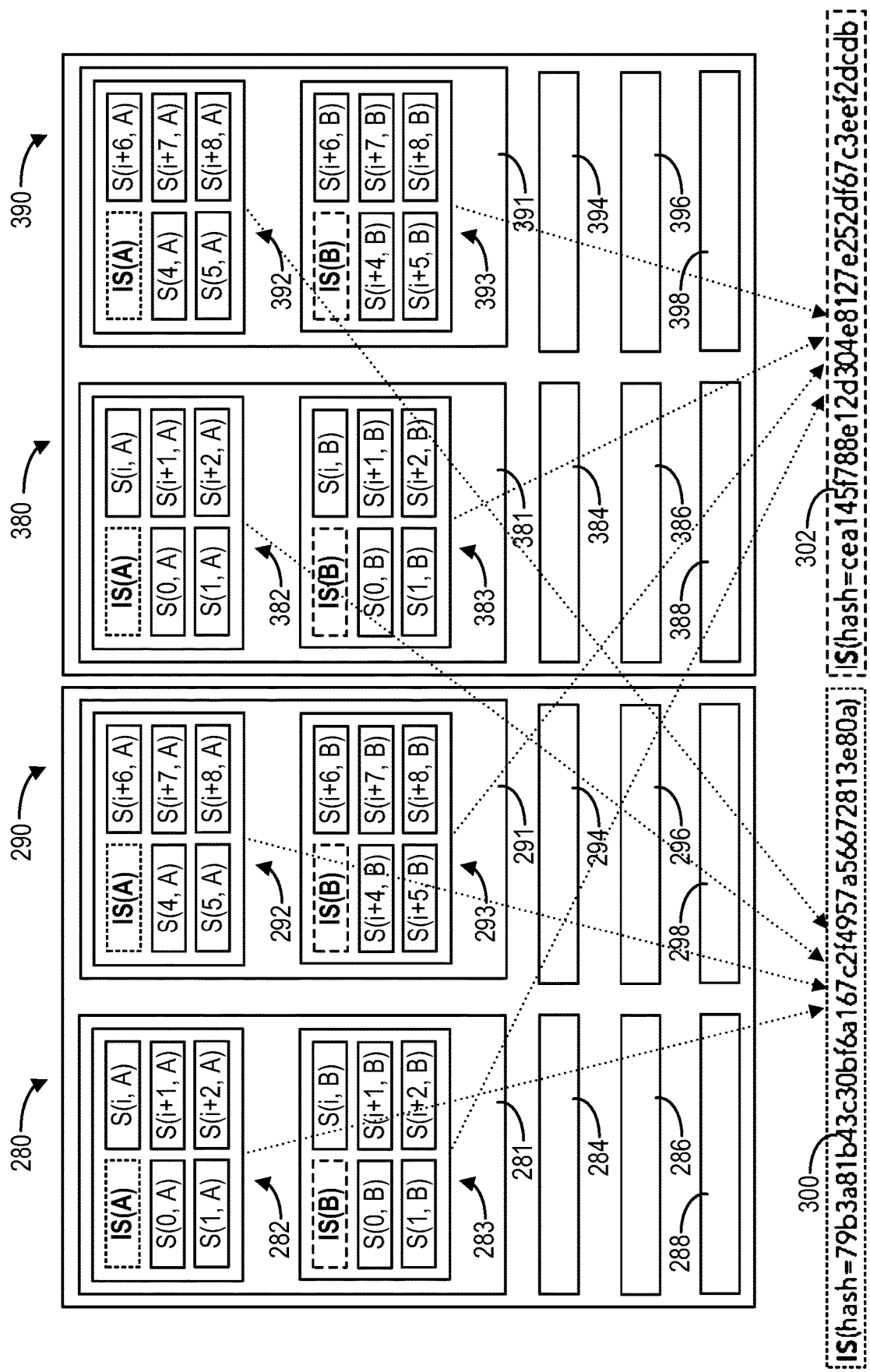
FIG. 3 shows example content.

Turning now to FIG. 3, example hashes 300 and 302 are shown (e.g., example unique identifiers as described herein). The hash 300 may correspond to a first representation, while the hash 302 may correspond to a second representation. The first portion 280 and the second portion 290 of the manifest file associated with the content item discussed with reference to FIG. 2 (referred to herein as "the first manifest file") are shown in FIG. 3 along with a first portion 380 and a second portion 390 of a second manifest file associated with a second content item. As described herein, a single initialization segment (e.g., a "normalized" or "common" initialization segment) associated with and/or within a representation may be used to initialize playback of any other content segment(s) for any content item associated with (e.g., encoded/packaged according to) a same set of common parameters (even if on a different channel), so long as that other content segment(s) is associated with and/or within that same representation.

In the context of FIG. 3, initialization segments associated with either of the aforementioned content items may be associated with one or more common parameters. Therefore, a "normalized" initialization segment associated with and/or within a given representation, and generated according to/based on the same one or more common parameters, may be used to initialize playback for any content segment(s)—for either content item, even if they are associated with different channels—so long as the particular content segment(s) is associated with and/or within that same representation. For example, the adaptation sets 281 and 291 within the first manifest file may comprise or be associated with a first plurality of common parameters. The first plurality of common parameters may be based on, and/or associated with, the first representation 292 that also corresponds to the first representation 282 (e.g., representation A, bitrate X, etc.).

As shown in FIG. 3, the first portion 380 and the second portion 390 of the second manifest file associated with the second content item may comprise adaptation sets 381 and 391 (respectively). The first portion 380 and the second portion 390 may each comprise a first representation 382, 392 (respectively) that corresponds to the first representation 292 and the first representation 282 (e.g., representation A). Thus, the first plurality of common parameters may be associated with the first representations 292, 282, 382, 392 (e.g., all corresponding to the first representation/representation A). For example, the hash 300 may be generated based on initialization segments associated with the first representation/representation A.

As mentioned, the hash 302 may correspond to a second representation, which may correspond to the second representation 293 and the second representation 283 (e.g., representation B). The content item associated with the second manifest file and portions 380, 390 may also be associated with the second representation, shown in FIG. 3 as a second representation 383 within the adaptation set 381 and a second representation 393 within the adaptation set 391. That is, the content segments associated with each of the second representations 293,283,383,393 may all be associated with (e.g., encoded for) a same representation, bitrate, resolution, quality level, etc. (e.g., representation B).

The adaptation sets 283 and 293 within the first manifest file may comprise or be associated with a second plurality of common parameters. The second plurality of common parameters may be based on, and/or associated with, the second representation 293 that also corresponds to the second representation 283 (e.g., representation B). Similarly, the adaptation sets 383 and 393 within the second manifest file may comprise or be associated with the second plurality of common parameters, which may also be based on, and/or associated with, the second representation 393 that also corresponds to the second representation 383 (e.g., representation B). That is, the second plurality of common parameters may be associated with the second representations 293,283,383,393 (e.g., all corresponding to the second representation/representation B). And the hash 302 may be generated based on initialization segments that are associated with the second representation/representation B and comprise the second plurality of common parameters.

Any suitable hashing algorithm(s) (e.g., MD5, SHA-1, CRC32, SHA-3, KangarooTwelve, CRC32, SHA-3, etc.) may be used to generate the hashes 300 and 302. The hashes 300, 302 may be stored in one or more storage media, caches, repositories, etc., of the system 100. For example, the hashes 300, 302 as well as any other hash generated by the encoder 134, the packager 136, the content server 138, the source 132, and/or another entity of the system 100 (not shown) may be stored in one or more locations within the system 100. And the encoder 134, the packager 136, the content server 138, the source 132, and/or another entity of the system 100 (not shown) may each be configured to perform a lookup operation each time a new initialization segment is to be generated. As mentioned, the lookup operation may include a comparison of a newly-generated unique identifier for a not-yet-generated initialization segment to a plurality of unique identifiers (e.g., stored in the one or more locations within the system 100) to determine whether any match the newly-generated unique identifier.

In the event a match for the newly-generated unique identifier (e.g., a hash value) is found, then the not-yet-generated initialization segment may not be generated at all and instead an existing initialization segment associated with a unique identifier that matches the newly-generated unique identifier may be provided/sent. For example, the unique identifier that matches the newly-generated unique identifier may be one of the plurality of unique identifiers already generated for the existing initialization segment (e.g., stored in the one or more locations within the system 100).

On the other hand, if the newly-generated unique identifier (e.g., hash value) is not found, then a corresponding manifest file for the content item (or portion thereof) may be updated. For example, an identifier for the newly-generated unique identifier (e.g., a URL comprising the hash value) may be appended to the manifest file (e.g., in a SegmentTemplate@initialization attribute). Additionally, or in the alternative, an existing identifier for an existing initialization segment associated with and/or matching the newly-generated unique identifier (e.g., a URL for the existing initialization segment) may be replaced with the identifier for the newly-generated unique identifier (e.g., the URL comprising the hash value).

In some examples, the not-yet-generated initialization segment may be analyzed with/compared to any existing initialization segment that corresponds to one of the plurality of unique identifiers already generated (e.g., stored in the one or more locations within the system 100) and matches the newly-generated unique identifier. Such analysis/comparison may be performed to identify one or existing initialization segments for potential deduplication and/or patching. For example, any initialization segment(s) may be determined, analyzed, etc., to identify any similar initialization segment(s) (e.g., initialization segments within a particular threshold of different values). Any unique identifier(s) that matches the newly-generated unique identifier may be among the plurality of unique identifiers already generated, and any such similar initialization segment(s) may be deleted/removed from cache/storage and/or caused to be deleted/removed from cache/storage (e.g., after a definable period of time).

Additionally, or in the alternative, the system 100 may be configured to generate and/or store a single initialization segment that is capable of initializing playback for a plurality of content segments along with associated content segment-specific (and/or content item-specific) "patch" files. For example, a patch file for a particular content segment associated with a plurality of common parameters that are also associated with the single initialization segment may indicate any difference(s) between the single initialization segment and a corresponding initialization segment for that particular content segment.

It should be noted that the corresponding initialization segment for that particular content segment may never be committed to storage/written, although it may be generated/determined for purposes of generating a corresponding patch file. The single initialization segment may be compressed, such as via GNU Zip or Brotli compression algorithms or the like. The patch files may be, for example, VCDIFF-formatted patch files. The single initialization segment and any corresponding patch file(s) may be stored in any suitable location within the system 100.

Still further, or in the alternative, the system 100 may be configured to generate and/or store initialization segments for the plurality of content segments as an omnibus initialization segment (e.g., as a single file). The omnibus initialization segment may effectively convey (or comprise) the same information that a plurality of individual initialization segments would convey (or comprise). For example, the omnibus initialization segment may comprise an address and/or byte range associated with a location within the omnibus initialization segment containing the information that would ordinarily be conveyed by an individual initialization segment of the plurality of individual initialization segments (e.g., a representation element(s)). As another example, the omnibus initialization segment may comprise an index that maps a corresponding representation identifier to a byte range associated with a location within the omnibus initialization segment containing information corresponding to that representation identifier.

Figure 4:
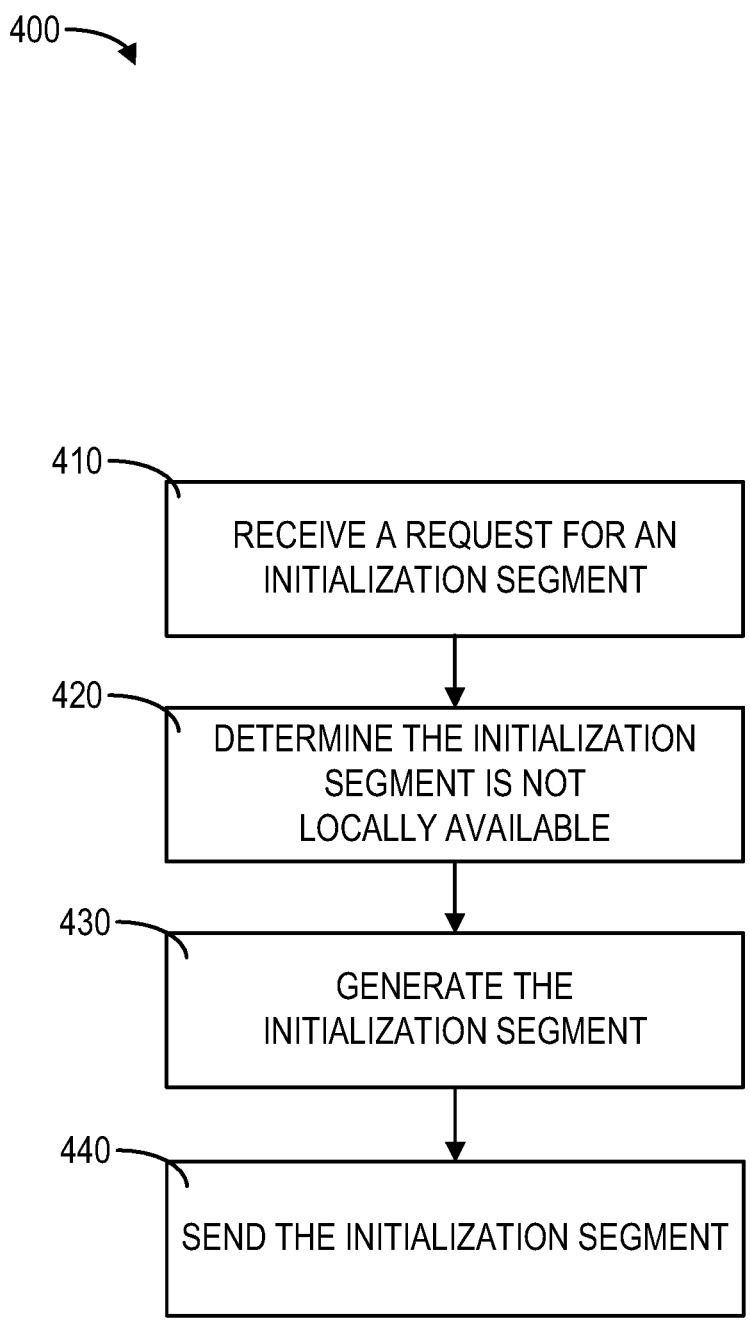
FIG. 4 shows a flowchart for an example method.

Turning now to FIG. 4, an example method 400 in accordance with one or more implementations of the methods, systems, and apparatuses described herein is shown. The steps of method 400 may be performed by one or more devices/entities of the system 100, such as the user device 102, the content server 138, the source 132, and/or a combination thereof. At step 410, a first computing device (e.g., the encoder 134, the packager 136, the content server 138, the source 132, and/or another entity of the system 100) may receive a request for an initialization segment. The request may be received from a second computing device (e.g., the user device 102, or another entity of the system 100 downstream relative to the first computing device). The requested initialization segment may be associated with a first content item of a plurality of content items. The second computing device may be presenting outputting, or preparing to output, a content segment(s) associated with the first content item. For example, the second computing device may be switching output of the first content item from a first representation to a second representation, and the requested initialization segment may be associated with the corresponding content segment(s) or a previous/next content segment at the second representation.

At step, 420 the first computing device may determine that the initialization segment associated with the request is not locally available. For example, the first computing device may determine whether the requested initialization segment is available for sending to the second computing device directly (e.g., presently stored in cache and/or at the computing device) or via another entity or storage medium in communication with the first computing device (e.g., any other entity of the system 100 upstream relative to the second computing device). The first computing device may determine that the requested initialization segment is not locally available when the first computing device determines that the requested initialization segment needs to be retrieved and/or requested from an upstream device (e.g., the packager 136, the encoder 134, or the source 132).

Additionally, or in the alternative, the first computing device may determine that the requested initialization segment is not locally available when the first computing device determines that the requested initialization segment needs to be generated. This may occur, for example, when the corresponding content segment is new and/or when he requested initialization segment has been removed/evicted from cache.

The first computing device may determine that the requested initialization segment is not available for sending to the second computing device directly or via another entity or storage medium in communication with the first computing device by performing a lookup operation. The first computing device may be configured to perform such a lookup operation each time an initialization segment is requested or is to be generated. The determination at step 420 (the "lookup operation") may comprise a comparison of a unique identifier for the requested initialization segment to a plurality of unique identifiers associated with the plurality of content items and/or a plurality of content segments for one or more content items (e.g., stored in cache and/or at any suitable storage medium associated with the system 100). For example, the first computing device may be configured to generate a unique identifier for any/all requested initialization segments.

The first computing device may generate a unique identifier associated with the initialization segment requested by the second computing device. The unique identifier may comprise a hash value. For example, the hash value may be based on and/or indicative of a plurality of common parameters associated with the plurality of content items. Any suitable hashing algorithm(s) (e.g., MD5, SHA-1, CRC32, SHA-3, KangarooTwelve, CRC32, SHA-3, etc.) may be used to generate the unique identifier. The first computing device may store the unique identifier in one or more storage media, caches, repositories, etc., of the system 100. For example, the first computing device may store the unique identifier associated with the requested initialization segment with, or associated with, the plurality of unique identifiers.

The first computing device may compare the unique identifier for the requested initialization segment to the plurality of unique identifiers. The first computing device may, based on the comparison, determine that the requested initialization segment is not locally available. At step 430, the first computing device may generate the requested initialization segment. For example, the first computing device may generate the requested initialization segment based on the comparison (e.g., based on determining that the requested initialization segment is not locally available). The first computing device may update a manifest file(s) (or a portion(s) thereof) associated with the initialization segment and/or the content item. For example, an identifier for the newly-generated unique identifier (e.g., a URL comprising the newly-generated unique identifier/hash value) may be appended to the manifest file(s) (e.g., in a SegmentTemplate@initialization attribute).

At step 440, the first computing device may send the initialization segment (e.g., the newly-generated initialization segment). For example, the first computing device may send the initialization segment to the second computing device. Additionally, or in the alternative, the first computing device may send the initialization segment to one or more storage media, caches, etc. The second computing device may receive the initialization segment. The second computing device may use the initialization segment to initialize playback of one or more content segments associated with the initialization segment.

Figure 5:
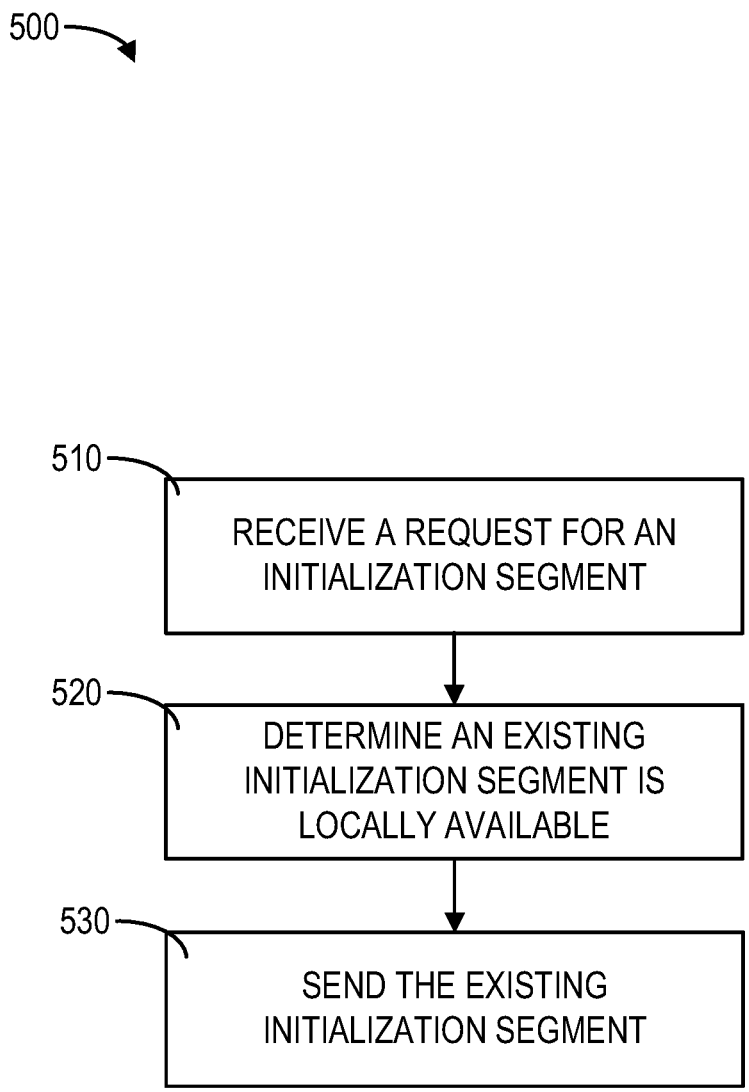
FIG. 5 shows a flowchart for an example method.

Turning now to FIG. 5, an example method 500 in accordance with one or more implementations of the methods, systems, and apparatuses described herein is shown. The steps of method 500 may be performed by one or more devices/entities of the system 100, such as the user device 102, the content server 138, the source 132, and/or a combination thereof. At step 510, a first computing device (e.g., the encoder 134, the packager 136, the content server 138, the source 132, and/or another entity of the system 100) may receive a request for an initialization segment. The request may be received from a second computing device (e.g., the user device 102, or another entity of the system 100 downstream relative to the first computing device). The requested initialization segment may be associated with a first content item of a plurality of content items. The plurality of content items may be associated with a same or different linear channel.

Additionally, or in the alternative, the plurality of content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like. The second computing device may be presenting, outputting, or preparing to output, a content segment(s) associated with the first content item. For example, the second computing device may be switching output of the first content item from a first representation to a second representation, and the requested initialization segment may be associated with the corresponding content segment(s) or a previous/next content segment at the second representation.

At step, 520 the first computing device may determine that an existing initialization segment is locally available. For example, the first computing device may determine whether a previously-generated initialization segment to be used in place of the requested initialization segment is locally available for sending to the second computing device directly (e.g., presently stored in cache and/or at the computing device) or via another entity or storage medium in communication with the first computing device (e.g., any other entity of the system 100 upstream relative to the second computing device).

The existing initialization segment may be a "normalized" initialization segment as described herein that may have been generated according to/based on a same set of common parameters and may be used to initialize playback for any content segment(s) for either content item, even if they are associated with different channels, so long as the particular content segment(s) is associated with and/or within a same representation. The first computing device may determine that the existing initialization segment to be used in place of the requested initialization segment is locally available when the first computing device determines that the requested initialization segment does not need to be retrieved and/or requested from an upstream device (e.g., the packager 136, the encoder 134, or the source 132). For example, the first computing device may first determine that the requested initialization segment is not locally available/stored at the first computing device and/or at a storage medium readily accessible by the first computing device (e.g., within a cache/caching device).

The first computing device may determine that the requested initialization segment is not locally available by performing a lookup operation. The first computing device may be configured to perform such a lookup operation each time an initialization segment is requested or is to be generated. The determination at step 520 (the "lookup operation") may comprise a comparison of a unique identifier for the requested initialization segment to a plurality of unique identifiers associated with the plurality of content items and/or a plurality of content segments for one or more content items (e.g., stored in cache and/or at any suitable storage medium associated with the system 100). For example, the first computing device may be configured to generate a unique identifier for any/all requested initialization segments.

The first computing device may generate (or may have already generated) the unique identifier associated with the requested initialization segment. Each initialization segment for each of the plurality of content items may comprise and/or reference values for a plurality of common parameters. The plurality of common parameters may be related to encoding as well as output and/or decoding of at least one content item of the plurality of content items.

However, no parameter within the plurality of common parameters may have a material impact on the output and/or decoding of the corresponding content item. For example, the plurality of common parameters may be associated with, and/or comprise, a file type, a video width, a video height, a frame rate, a profile/level/tier, a sequence parameter, a picture parameter, a quantization parameter, a timescale, a duration, a creation time, a file format, a codec, a combination thereof, and/or the like. The plurality of common parameters may be associated with one or more elements of one or more adaptation sets associated with the plurality of content items.

The unique identifier associated with the requested initialization segment may comprise a hash value, for example. Any suitable hashing algorithm(s) (e.g., MD5, SHA-1, CRC32, SHA-3, KangarooTwelve, CRC32, SHA-3, etc.) may be used to generate the unique identifier associated with the requested initialization segment. For example, as part of performing the lookup operation at step 520, the first computing device (or another device in communication therewith) may first generate (or retrieve) the requested initialization segment, and the first computing device (or another device in communication therewith) may generate the unique identifier associated with the requested initialization segment by determining a hash value based on the requested initialization segment. The unique identifier associated with the requested initialization segment may be based on and/or comprise that hash value.

The first computing device may store the unique identifier associated with the requested initialization segment in one or more storage media, caches, repositories, etc., of the system 100. For example, the first computing device may store the unique identifier associated with the requested initialization segment with, or associated with, the plurality of unique identifiers. The first computing device may compare the unique identifier for the requested initialization segment to the plurality of unique identifiers.

The first computing device may, based on the comparison, determine that the existing initialization segment may be used in place of the requested initialization segment. For example, the first computing device may compare the unique identifier for the requested initialization segment to the plurality of unique identifiers to determine whether any match. The first computing device may determine that the unique identifier for the requested initialization segment matches a first unique identifier of the plurality of unique identifiers. That is, the unique identifier for the requested initialization segment may be the first unique identifier. The first unique identifier may correspond to the existing initialization segment. Thus, the first computing device may determine that the existing initialization segment is to be used in place of the requested initialization segment based on the unique identifier for the requested initialization segment matching the first unique identifier corresponding to the existing initialization segment.

At step 530, the first computing device may send the existing initialization segment to the second computing device. For example, based on the unique identifier for the requested initialization segment matching the first unique identifier, the first computing device may determine that a new initialization segment (e.g., for the corresponding content segment(s) indicated by the request received at step 510) does not need to be generated or requested/retrieved from an upstream device and the existing initialization segment may be used in place.

Additionally, or in the alternative, in the event the first computing device generated (or caused to be generated) the requested initialization segment in order to perform the lookup operation (e.g., to determine the first unique identifier), then the first computing device may determine that the requested initialization segment does not need to be committed to storage (e.g., it may be discarded) based on the match. Instead, the existing initialization segment associated with the first unique identifier (e.g., matching the newly-generated unique identifier for the requested initialization segment) may be sent to the second computing device. The first computing device may retrieve the existing initialization segment from cache/storage at the first computing device and/or at a storage medium readily accessible by the first computing device (e.g., within a same network and/or accessible without sending a corresponding request).

The second computing device may receive the existing initialization segment. The second computing device may use the existing initialization segment to initialize playback of one or more content segments. The one or more content segments may be, or be associated with, the first content item (and/or a content segment thereof). The one or more content segments may be associated with another content item within the plurality of content items. The plurality of content items may be associated with a same plurality of common parameters used to initialize playback of corresponding segments (e.g., common parameters that are valid across the segments). Additionally, or in the alternative, the plurality of content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like.

The first computing device may delete/remove one or more further initialization segments from cache/storage and/or cause the one or more further initialization segments to be deleted/removed from cache/storage (e.g., after a definable period of time). For example, the one or more further initialization segments may be associated with the one or more content segments for which the second computing device may initialize playback using the existing initialization segment.

Figure 6:
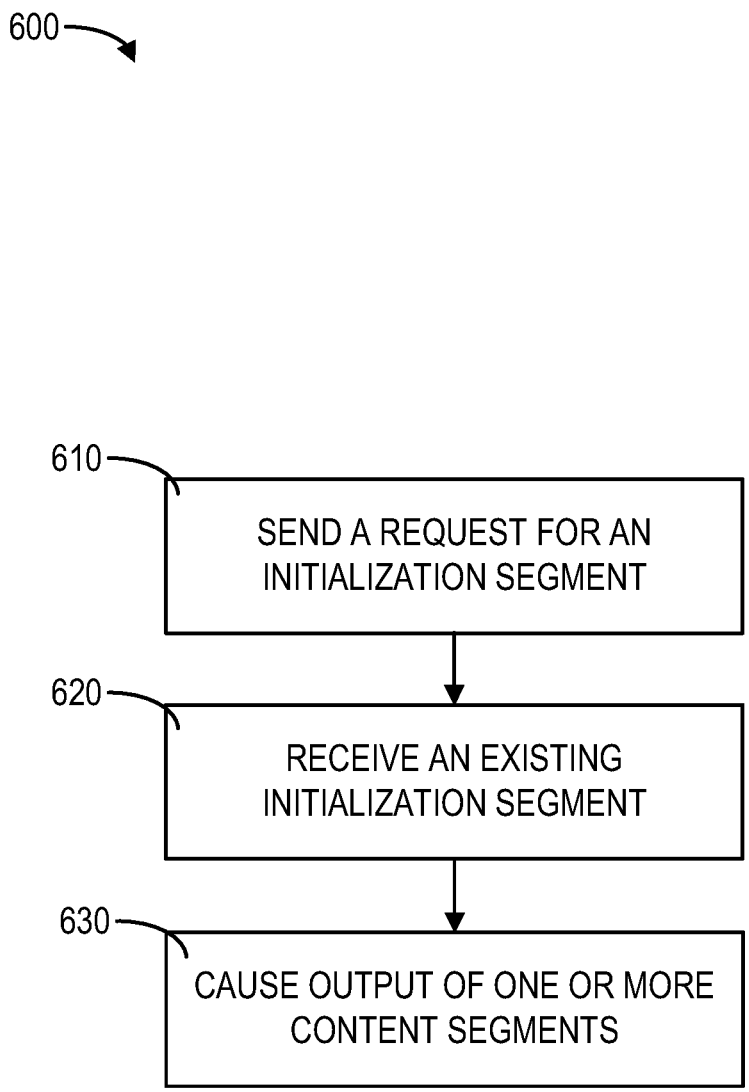
FIG. 6 shows a flowchart for an example method.

Turning now to FIG. 6, an example method 600 in accordance with one or more implementations of the methods, systems, and apparatuses described herein is shown. The steps of method 600 may be performed by one or more devices/entities of the system 100, such as the user device 102, the content server 138, the source 132, and/or a combination thereof. At step 610, a first computing device (e.g., the user device 102, or another entity of the system 100 downstream relative to the first computing device) may send a request for an initialization segment. The request may be received by a second computing device (e.g., the encoder 134, the packager 136, the content server 138, the source 132, and/or another entity of the system 100). The requested initialization segment may be associated with a first content item of a plurality of content items. The plurality of content items may be associated with a same plurality of common parameters used to initialize playback of corresponding segments (e.g., common parameters that are valid across the segments). Additionally, or in the alternative, the plurality of content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like. The first computing device may be presenting outputting, or preparing to output, a content segment(s) associated with the first content item. For example, the first computing device may be switching output of the first content item from a first representation to a second representation, and the requested initialization segment may be associated with the corresponding content segment(s) or a previous/next content segment at the second representation.

The second computing device may determine that an existing initialization segment is locally available. For example, the second computing device may determine whether a previously-generated initialization segment to be used in place of the requested initialization segment is locally available for sending to the first computing device directly (e.g., presently stored in cache and/or at the computing device) or via another entity or storage medium in communication with the second computing device (e.g., any other entity of the system 100 upstream relative to the second computing device). The second computing device may determine that existing initialization segment to be used in place of the requested initialization segment is locally available when the second computing device determines that the requested initialization segment does not need to be retrieved and/or requested from an upstream device (e.g., the packager 136, the encoder 134, or the source 132). For example, the second computing device may first determine that the requested initialization segment is not locally available/stored at the second computing device and/or at a storage medium readily accessible by the second computing device (e.g., within a cache/caching device).

The second computing device may determine that the requested initialization segment is not locally available by performing a lookup operation. The second computing device may be configured to perform such a lookup operation each time an initialization segment is requested or is to be generated. The lookup operation may comprise a comparison of a unique identifier for the requested initialization segment to a plurality of unique identifiers associated with the plurality of content items and/or a plurality of content segments for one or more content items (e.g., stored in cache and/or at any suitable storage medium associated with the system 100). For example, the second computing device may be configured to generate a unique identifier for any/all requested initialization segments.

The second computing device may generate (or may have already generated) the unique identifier associated with the requested initialization segment. Each initialization segment for each of the plurality of content items may comprise and/or reference values for a plurality of common parameters. The plurality of common parameters may be related to encoding as well as output and/or decoding of at least one content item of the plurality of content items. However, no parameter within the plurality of common parameters may have a material impact on the output and/or decoding of the corresponding content item. For example, the plurality of common parameters may be associated with, and/or comprise, a file type, a video width, a video height, a frame rate, a profile/level/tier, a sequence parameter, a picture parameter, a quantization parameter, a timescale, a duration, a creation time, a file format, a codec, a combination thereof, and/or the like. The plurality of common parameters may be associated with one or more elements of one or more adaptation sets associated with the plurality of content items.

The unique identifier associated with the requested initialization segment may comprise a hash value, for example. Any suitable hashing algorithm(s) (e.g., MD5, SHA-1, CRC32, SHA-3, KangarooTwelve, CRC32, SHA-3, etc.) may be used to generate the unique identifier associated with the requested initialization segment. For example, as part of performing the lookup operation, the second computing device (or another device in communication therewith) may first generate (or retrieve) the requested initialization segment, and the second computing device (or another device in communication therewith) may generate the unique identifier associated with the requested initialization segment by determining a hash value based on the requested initialization segment. The unique identifier associated with the requested initialization segment may be based on and/or comprise that hash value.

The second computing device may store the unique identifier associated with the requested initialization segment in one or more storage media, caches, repositories, etc., of the system 100. For example, the second computing device may store the unique identifier associated with the requested initialization segment with, or associated with, the plurality of unique identifiers. The second computing device may compare the unique identifier for the requested initialization segment to the plurality of unique identifiers. The second computing device may, based on the comparison, determine that the existing initialization segment may be used in place of the requested initialization segment. For example, the second computing device may compare the unique identifier for the requested initialization segment to the plurality of unique identifiers to determine whether any match.

The second computing device may determine that the unique identifier for the requested initialization segment matches a first unique identifier of the plurality of unique identifiers. That is, the unique identifier for the requested initialization segment may be the first unique identifier. The first unique identifier may correspond to the existing initialization segment. Thus, the second computing device may determine that the existing initialization segment is to be used in place of the requested initialization segment based on the unique identifier for the requested initialization segment matching the first unique identifier corresponding to the existing initialization segment.

At step 620, the first computing device may receive the existing initialization segment. The second computing device may send the existing initialization segment to the first computing device. For example, based on the unique identifier for the requested initialization segment matching the first unique identifier, the second computing device may determine that a new initialization segment (e.g., for the corresponding content segment(s) indicated by the request) does not need to be generated or requested/retrieved from an upstream device and the existing initialization segment may be used in place. Additionally, or in the alternative, in the event the second computing device generated (or caused to be generated) the requested initialization segment in order to perform the lookup operation (e.g., to determine the first unique identifier), then the second computing device may determine that the requested initialization segment does not need to be committed to storage (e.g., it may be discarded) based on the match. Instead, the existing initialization segment associated with the first unique identifier (e.g., matching the newly-generated unique identifier for the requested initialization segment) may be sent to the first computing device. The second computing device may retrieve the existing initialization segment from cache/storage at the second computing device and/or at a storage medium readily accessible by the second computing device (e.g., within a same network and/or accessible without sending a corresponding request).

The first computing device may receive the existing initialization segment. At step 630, the first computing device may cause output of one or more content segments associated with the existing initialization segment. For example, the first computing device may use the existing initialization segment to initialize playback of the one or more content segments. The one or more content segments may be, or be associated with, the first content item (and/or a content segment thereof). The one or more content segments may be associated with another content item within the plurality of content items. The plurality of content items may be associated with the plurality of common parameters used to initialize playback of corresponding segments (e.g., common parameters that are valid across the segments).

Additionally, or in the alternative, the plurality of content items may be stored/recorded content items, or at least portions thereof (e.g., pursuant to a cloud-based recording scheme, such as cDVR), and each stored/recorded content item or portion(s) thereof may be associated with a same user device, a same user profile, a same subscriber identifier, a combination thereof, and/or the like. The second computing device may delete/remove one or more further initialization segments from cache/storage and/or cause the one or more further initialization segments to be deleted/removed from cache/storage (e.g., after a definable period of time). For example, the one or more further initialization segments may be associated with the one or more content segments for which the first computing device may initialize playback using the existing initialization segment.

While the methods and systems have been described in connection with preferred embodiments and specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by a first computing device, a request for an initialization segment associated with a content item of a plurality of content items, wherein the plurality of content items are associated with a common bitrate;
   based on the requested initialization segment associated with the content item not being locally available, generating, based on the common bitrate, a first initialization segment that is associated with the plurality of content items; and
   sending, based on the request, the first initialization segment, wherein the first initialization segment facilitates output of the plurality of content items at the common bitrate.

2. The method of claim 1, further comprising sending, by a second computing device, the request, wherein the first computing device is a content server and the second computing device is a user device.

3. The method of claim 1, wherein the common bitrate is associated with one or more adaptation sets within a manifest file for the content item.

4. The method of claim 1, wherein determining that the requested initialization segment is not locally available comprises at least one of:
   determining, based on the request, that the requested initialization segment is not available in cache;
   determining, based on the request, that the requested initialization segment is not stored at a storage medium readily accessible by the first computing device; or
   determining, based on the request, that the requested initialization segment is not stored at the first computing device.

5. The method of claim 1, wherein generating the first initialization segment comprises generating, based on a plurality of common parameters, a unique identifier associated with the plurality of content items, wherein the plurality of content items are associated with the plurality of common parameters.

6. The method of claim 1, further comprising comparing a unique identifier associated with the requested initialization segment to a plurality of unique identifiers, wherein the plurality of unique identifiers are associated with at least one content item associated with the requested initialization segment.

7. The method of claim 1, further comprising:
   receiving, by a second computing device, the first initialization segment; and
   causing, by the second computing device based on the first initialization segment, playback of at least one content segment associated with the content item to be initialized.

8. A method comprising:
   receiving, by a first computing device, a request for an initialization segment associated with a content item of a plurality of content items, wherein the plurality of content items are associated with a common bitrate;
   determining, based on the request, that an existing initialization segment is to be sent in place of the requested initialization segment, wherein the existing initialization segment is based on the common bitrate; and
   sending the existing initialization segment, wherein the existing initialization segment facilitates output of the plurality of content items at the common bitrate.

9. The method of claim 8, further comprising sending, by a second computing device, the request, wherein the first computing device is a content server and the second computing device is a user device.

10. The method of claim 8, wherein the existing initialization segment is associated with the plurality of content items.

11. The method of claim 8, further comprising determining that the existing initialization segment is locally available based on at least one of:
   determining, based on the request, that the existing initialization segment is available in cache;
   determining, based on the request, that the existing initialization segment is stored at a storage medium readily accessible by the first computing device; or
   determining, based on the request, that the existing initialization segment is stored at the first computing device.

12. The method of claim 8, further comprising:
   generating a unique identifier associated with the requested initialization segment; and
   determining, based on a comparison of the unique identifier to a plurality of unique identifiers, that the existing initialization segment is locally available.

13. The method of claim 8, further comprising:
   receiving, by a second computing device, the existing initialization segment; and
   causing, by the second computing device based on the existing initialization segment, playback of at least one content segment to be initialized.

14. The method of claim 13, wherein the requested initialization segment is associated with a content segment associated with a first period or a first representation, and wherein the at least one content segment is associated with the first period or the first representation.

15. A method comprising:
   sending, by a first computing device, a request for an initialization segment associated with a content item of a plurality of content items, wherein the plurality of content items are associated with a common bitrate;
   receiving, based on the request, an existing initialization segment, wherein the existing initialization segment is received in place of the requested initialization segment, and wherein the existing initialization segment is based on the common bitrate; and
   causing, based on the existing initialization segment, output of the content item, wherein the existing initialization segment facilitates output of the plurality of content items at the common bitrate.

16. The method of claim 15, wherein the plurality of content items are associated with the initialization segment and the existing initialization segment.

17. The method of claim 15, wherein the requested initialization segment and the existing initialization segment are associated the common bitrate.

18. The method of claim 15, further comprising receiving, by a second computing device, the request, wherein the first computing device is a user device and the second computing device is a content server.

19. The method of claim 18, further comprising determining, by the second computing device, that the requested initialization segment is not locally available.

20. The method of claim 18, further comprising:
   generating, by the second computing device, a unique identifier associated with the requested initialization segment; and
   determining, based on a comparison of the unique identifier to a plurality of unique identifiers, that the existing initialization segment is locally available.

* * * * *